United States Patent
Persson et al.

(10) Patent No.: US 6,783,154 B2
(45) Date of Patent: Aug. 31, 2004

(54) METAL AIR-BAG

(75) Inventors: Dan Persson, Alingons (SE); Staffari Carlsson, Karlskoga (SE)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 10/168,338

(22) PCT Filed: Dec. 21, 2000

(86) PCT No.: PCT/SE00/02624
§ 371 (c)(1),
(2), (4) Date: Jun. 20, 2002

(87) PCT Pub. No.: WO01/45986
PCT Pub. Date: Jun. 28, 2001

(65) Prior Publication Data
US 2002/0190504 A1 Dec. 19, 2002

(30) Foreign Application Priority Data
Dec. 21, 1999 (GB) .......................... 99301863

(51) Int. Cl.[7] .............................................. B60R 21/16
(52) U.S. Cl. .................................................. 280/743.1
(58) Field of Search ..................... 280/743.1, 728.1, 280/729

(56) References Cited

U.S. PATENT DOCUMENTS

| | | | |
|---|---|---|---|
| 3,425,712 A | | 2/1969 | Berryman |
| 5,642,905 A | | 7/1997 | Honda |
| 5,839,756 A | | 11/1998 | Schenck et al. |
| 5,868,422 A | | 2/1999 | Galbraith et al. |
| 6,142,508 A | * | 11/2000 | Lewis ..................... 280/730.2 |
| 6,413,597 B1 | * | 7/2002 | Hirai ......................... 428/35.2 |

FOREIGN PATENT DOCUMENTS

| | | |
|---|---|---|
| DE | 39 34 588 A1 | 4/1991 |
| DE | 44 25 830 A1 | 5/1995 |
| EP | 0 812 736 A1 | 12/1997 |
| GB | 2 297 950 A | 8/1996 |
| WO | WO 96/22199 A1 | 7/1996 |
| WO | WO 00/50270 A1 | 8/2000 |

* cited by examiner

Primary Examiner—Son T Nguyen
(74) Attorney, Agent, or Firm—Venable LLP; Robert Kinberg

(57) ABSTRACT

An air-bag is made from a first metal layer (1) and a second metal layer (30). At least one of these layers is plastically deformable. The layers are provided with a peripheral (2, 3) sealing the layers together to define a chamber. There are gas generating means, such as a gas generator, located within the chamber.

13 Claims, 2 Drawing Sheets

METAL AIR-BAG

THE PRESENT INVENTION relates to an air-bag and more particularly relates to an air-bag intended for use in a vehicle such as a motor car.

It has been proposed previously to provide air-bags in motor vehicles such as motor cars, the air-bags being adapted to be inflated in the event that an accident should occur.

A typical air-bag is made of a fabric, such as a woven polyamide material, and the air-bag is adapted to be inflated very rapidly in response to a signal which senses an impact or an accident situation.

Typically, such air-bags are located in the steering wheel or in the dash-board to provide protection for an occupant of the vehicle in the event that a frontal impact should occur. Such air-bags are inflated relatively rapidly and commence deflation almost immediately so as to provide a soft cushion. A soft cushion tends to decelerate an occupant of a vehicle, when the occupant is thrown forwardly during a frontal impact, without injuring the occupant.

Air-bags of the type described above are generally inflated in a period of time which is less than 50 milliseconds, and often the air-bag is substantially deflated 200 milliseconds after the impact is sensed. Consequently, air-bags of this type do not provide sustained protection, which may be desirable in the event of a roll-over accident and which may also be desirable in the event that a second impact should occur following an initial impact.

It has been proposed (see WO96/22199) to use a metal air-bag with a separate gas generator. The described metal air-bag is of a complex design and difficult to manufacture. A similar air-bag is disclosed in U.S. Pat. No. 5,868,422. U.S. Pat. No. 3,425,712 discloses an air-bag with a gas generator located within the air-bag.

The present invention seeks to provide an improved air-bag arrangement.

According to this invention there is provided an air-bag, said air-bag comprising a first metal layer and a second metal layer super-imposed on the first layer, at least one of said layers being plastically deformable, the layers being provided with a peripheral seal sealing the layers together to define a substantially gas-tight chamber, there being gas generating means within the chamber and means to activate the gas generating means, wherein the gas generating means are retained in position by regions of the said two layers where the two layers are secured together.

The metal may be coated with plastic or laminated in some other way.

The metal layers preferably have a very low permeability. The air-bag, when inflated, may remain inflated for a relatively long period of time, thus providing sustained protection. The use of metal may also provide the advantages of corrosion resistance and wear resistance.

Preferably the first chamber is substantially gas-tight.

Advantageously both of the layers are plastically deformable.

Advantageously the gas generating means are retained in position in a respective chamber that communicates with the first chamber.

Conveniently the gas generating means comprise pyrotechnic means, and the means to activate the gas generating means comprise means to ignite the pyrotechnic means.

Preferably the pyrotechnic means comprise an igniter adapted to be ignited in response to an electrical signal, and an inflator adapted to be activated in response to activation of the igniter.

Advantageously the igniter comprises a pyrotechnic charge within a housing formed of a plastics material.

Conveniently the inflator comprises a pyrotechnic charge within a housing of a plastic material.

Preferably the igniter and the inflator are located in adjacent recesses defined by the said first metal layer and second metal layer, with there being a passage between the two recesses providing a communication between the recesses.

Conveniently the chamber is divided into a plurality of inter-communicating cells by a plurality of regions in which the first layer is secured to the second layer.

Preferably in the regions where the first layer is secured to the second layer, the first layer is welded to the second layer.

Advantageously the peripheral seal is constituted by a peripheral weld.

In order that the invention may be more readily understood, and so that further features thereof may be appreciated, the invention will now be described, by way of example, with reference to the accompanying drawings.

Figure 1:
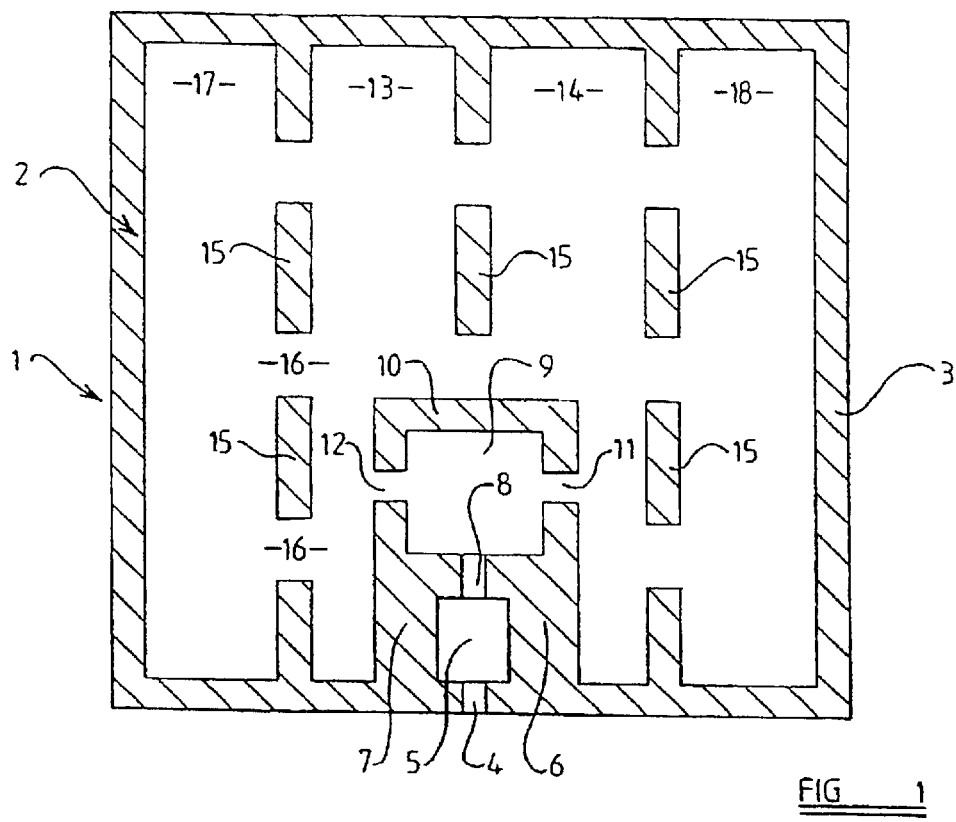
FIG. 1 is a plan view of an air-bag in accordance with the invention in an uninflated state.

Referring initially to FIG. 1 of the accompanying drawings, a substantially square metal sheet 1 is illustrated, which is to be utilised to form part of an air-bag in accordance with the invention, with regions 2 of the sheet which are to be welded or otherwise secured to another corresponding sheet being shaded. The sheets may be plastic coated or laminated in some other way.

The metal sheet has a thickness such that the metal sheet is plastically deformable.

The regions 2 where the sheet is to be welded to a corresponding sheet include a peripheral region 3 surrounding substantially the whole of the exterior of the sheet, with the exception of a small region 4 located in the centre of one side of the sheet. The region 4 is slightly recessed, and is aligned with a larger recess 5 located adjacent the edge of the sheet The recess 5 is bounded by regions 6,7 where the sheet 1 is to be welded or otherwise connected to a super-imposed sheet. The regions 6,7 are separated by a further passageway 8 which is aligned with the passageway small region 4 that is located on the opposite side of the recess 5. The passageway 8 leads to a further recess 9. The recess 9 is bounded by a region 10 which substantially surrounds the recess 9. The region 10 has two breaks or passages 11,12 formed therein, The passages 11,12 form a communication between the recess 9 and two cells 13,14 which are defined by a plurality of aligned regions 15 where the illustrated sheet 1 is to be connected to a super-imposed sheet The regions 15 extend transversely across the sheet 1 in three parallel lines, with the regions 15 being separated by gaps 16. The regions 15 and the gaps 16 serve to define not only the cells 13,14 but also two additional cells 17,18, with all of the cells 13,14, 17,18 being in communication with each other through the gaps 16.

Figure 2:
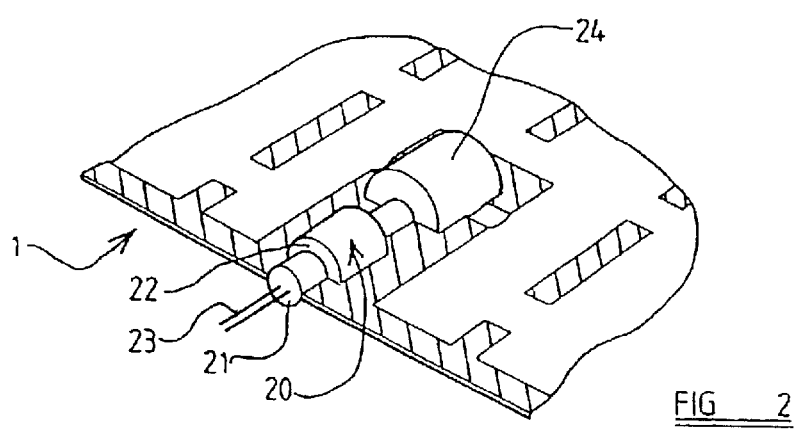
FIG. 2 is a part schematic view corresponding to FIG. 1 of an air-bag in an uninflated state.

Referring now to FIG. 2 of the accompanying drawings, the sheet 1 is again illustrated. An igniter 20 is shown. The igniter 20 has a plug 21 which is formed on one end of a cylindrical housing 22. The plug 21 is located within the passage 4 and the housing 22 is located within the recess 5.

The housing 22 may be formed of a plastics material. The housing 22 contains a pyrotechnic charge. A pair of electric wires 23 are provided which extend through the plug to a squib located within the housing 22.

An inflator 24 is illustrated. The inflator 24 comprises a cylindrical housing, which may be formed of a plastics material which contains an appropriate pyrotechnic material. An inflator 24 is located within the recess 9.

Figure 3:
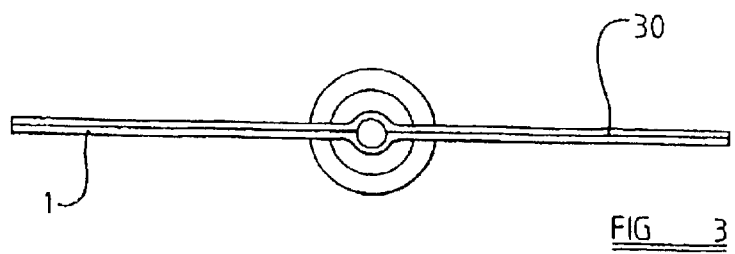
FIG. 3 is a side view of the air-bag of FIGS. 1 and 2 in an uninflated state.

FIG. 3 illustrates a complete air-bag in accordance with the invention. A second sheet 30, which is identical to the sheet 1 of FIG. 1, is super-imposed on top of the combination of the sheet 1, the igniter 20 and the inflator 24 as shown in FIG. 2. The sheet 1 and the sheet 30 are welded or otherwise secured together in all of the shaded regions 2 as described above and with reference to FIG. 1. The peripheral region 3 is secured to the plug 21 of the igniter 20 so that the peripheral region 3 forms a substantially gas-tight seal. The complete air-bag comprises a first or main chamber incorporating the cells 13, 14, 17 and 18, which is in communication with a second chamber, constituted by the recess 9, where the pyrotechnic material is retained in position by the regions of the metal sheets 1 and 30 that have been welded together.

As can be seen from FIG. 3, the igniter 20 is of a lesser diameter than the inflator 24.

The air-bag, as described above, is intended to be mounted in a motor vehicle and associated with a sensor adapted to sense an accident situation. The sensor provides an electrical signal through the wires 23 to activate the igniter 20. The pyrotechnic material within the igniter 20 is thus ignited. Hot gas flows through the passage 8 extending between the recess 5 and the recess 9. The hot gas ignites the pyrotechnic charge within the inflator 24. The pyrotechnic charge within the inflator 24 generates hot gas which passes through the passageways 11 and 12 from the recess 9 so that gas is supplied to the cells 13 and 14, and subsequently to the cells 17 and 18.

The passageways 11 and 12 are dimensioned so that a sufficient pressure is maintained within the recess 9 during combustion of the pyrotechnic material within the inflator 24 to ensure that the combustion is completed in an effective manner.

Figure 4:
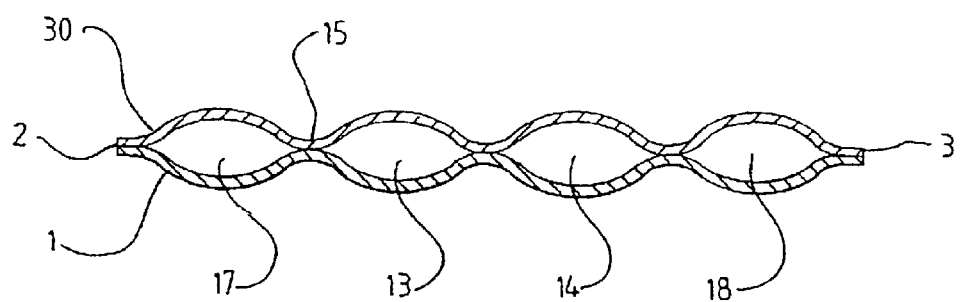
FIG. 4 is a schematic sectional view of the air-bag, as shown in FIGS. 1–3, in an inflated state.

The cells 13, 14, 17 and 18 inflate to have a substantially cylindrical form, as shown in FIG. 4. As the cells inflate the sheets 1 and 30 each deform plastically. The first chamber defined by the cells 13, 14, 17 and 18 may be substantially gas-tight, and thus all of the combustion products of the pyrotechnic charges within the igniter 20 and the inflator 24 are retained within the chamber defined by the air-bag, and the heat of combustion is also retained within the air-bag, at least initially. This facilitates full inflation of the air-bag. Because the gas generating means constituted by the igniter and the inflator are contained within the chamber defined by the air-bag, there is no need to provide a separate gas generator housing, and also no need to provide a duct connecting the gas generator housing to the air-bag. However, the air-bag may be provided with a vent adapted to permit some gas to escape. The vent may be sealed, for example by a foil or plug, so that the vent may open automatically if the pressure in the air-bag exceeds a pre-determined threshold.

It is envisaged that an air-bag as described above may be mounted in various alternative positions within a motor vehicle. For example, the air-bag may be mounted on a side door to provide protection in the event that a side impact should occur, or may be mounted beneath a dashboard to provide protection for the knees and lower legs of an occupant of a vehicle. It is envisaged that the air-bag will be inflated within a relatively short period of time, but will remain inflated for a relatively long period of time, at least when compared with the time of inflation of a prior proposed fabric bag. Since the metal is not permeable, or has a very low permeability, the gas will be retained within the bag, thus keeping the bag inflated. An air-bag as described may thus provide valuable protection in the event, for example, of a roll-over accident. Since the air-bag is of metal, and the metal is plastically deformed during inflation, the air-bag will retain its "inflated" form, even if a vent is opened and the air pressure in the air-bag is reduced to atmospheric pressure.

The use of metal may make the air-bag especially suitable for use where the bag is exposed to wear, or where the bag is in an environment where a fabric bag may deteriorate, particularly if the metal is corrosion-resistant In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. An Air-bag comprising
a first metal layer,
a second metal layer superimposed on the first metal layer,
gas generating means, and
means to activate the gas generating means,
wherein at least one of the layers is plastically deformable, and the layers are provided with a peripheral seal sealing the layers together to define a first chamber,
wherein the gas generating means are retained in position within a sub-chamber of the first chamber, said sub-chamber is defined by regions of the two layers secured together within the first chamber.

2. An air-bag according to claim 1 wherein the first chamber is substantially gas-tight.

3. An air-bag according to claim 1 wherein both of the layers are plastically deformable.

4. An air-bag according to claim 1 wherein the sub-chamber of the first chamber communicates with remainder of the first chamber.

5. An air-bag according to claim 1 wherein the gas generating means comprise pyrotechnic means, and the means to activate the gas generating means comprise means to ignite the pyrotechnic means.

6. An air-bag according to claim 5 wherein the pyrotechnic means comprise an igniter adapted to be ignited in response to an electrical signal, and an inflator adapted to be activated in response to activation of the igniter.

7. An air-bag according to claim 6 wherein the igniter comprises a pyrotechnic charge within a housing formed of a plastics material.

8. An air-bag according to claim 6 wherein the igniter comprises a pyrotechnic charge within a housing formed of a plastics material.

9. An air-bag according to claim 6 wherein the igniter and the inflator are located in adjacent recesses defined by the first metal layer and second metal layer, with there being a passage between the two recesses providing a communication between the recesses.

10. An air-bag according to claim 5 wherein the pyrotechnic means communicate with the first chamber by one or more flow passages of a constricted size.

11. An air-bag according to claim 1 wherein the first chamber is divided into a plurality of inter-communicating cells by a plurality of regions in which the first layer is secured to the second layer.

12. An air-bag according to claim 1 wherein, in the regions where the first layer is secured to the second layer, the first layer is welded to the second layer.

13. An air-bag according to claim 1 wherein the peripheral seal is constituted by a peripheral weld.

* * * * *